United States Patent
Kasuga et al.

(10) Patent No.: US 7,684,172 B2
(45) Date of Patent: Mar. 23, 2010

(54) SOLID ELECTROLYTIC CAPACITOR AND FORMING METHOD FOR THE SAME

(75) Inventors: Takeo Kasuga, Sendai (JP); Yuji Yoshida, Sendai (JP); Masanori Takahashi, Sendai (JP); Ryuta Kobayakawa, Sendai (JP); Takeshi Saito, Sendai (JP); Koji Sakata, Sendai (JP); Sadamu Toita, Sendai (JP); Katsuhiro Yoshida, Sendai (JP)

(73) Assignee: NEC TOKIN Corporation, Sendai-shi (JP)

( * ) Notice: Subject to any disclaimer, the term of this patent is extended or adjusted under 35 U.S.C. 154(b) by 78 days.

(21) Appl. No.: 11/986,911

(22) Filed: Nov. 27, 2007

(65) Prior Publication Data

US 2008/0123252 A1 May 29, 2008

(30) Foreign Application Priority Data

Nov. 28, 2006 (JP) .............................. 2006-319754

(51) Int. Cl.
*H01G 9/04* (2006.01)
*H01G 9/145* (2006.01)

(52) U.S. Cl. ................... 361/532; 361/528; 29/25.03
(58) Field of Classification Search .................. 361/523, 361/525, 526–527
See application file for complete search history.

(56) References Cited

U.S. PATENT DOCUMENTS

| 4,780,796 A | 10/1988 | Fukuda et al. |
| 4,910,645 A | 3/1990 | Jonas et al. |
| 4,959,430 A | 9/1990 | Jonas et al. |
| 4,987,042 A | 1/1991 | Jonas et al. |
| 5,035,926 A | 7/1991 | Jonas et al. |
| 5,300,575 A | 4/1994 | Jonas et al. |
| 6,327,138 B1 | 12/2001 | Asami et al. |
| 6,430,033 B1 * | 8/2002 | Mitsui et al. ................ 361/525 |
| 7,268,997 B2 | 9/2007 | Saitou et al. |
| 2006/0187617 A1 | 8/2006 | Toida et al. |

FOREIGN PATENT DOCUMENTS

| EP | 0 440 957 B1 | 3/1996 |
| EP | 1 093 136 A2 | 4/2001 |
| JP | 2002-60736 A | 2/2002 |
| JP | 2005-159154 A | 6/2005 |

OTHER PUBLICATIONS

Extended European Search Report dated Apr. 2, 2008, issued in a corresponding European Application.

* cited by examiner

*Primary Examiner*—Eric Thomas
(74) *Attorney, Agent, or Firm*—Frishauf, Holtz, Goodman & Chick, P.C.

(57) ABSTRACT

A solid electrolytic capacitor includes a valve metal formed with an anodized film; an inner conductive polymer film formed on the anodized film; and an outer conductive polymer film formed on the inner conductive polymer film. The outer conductive polymer film is obtained by: preparing a first polymer solution (PEDOT/PSSA); dissolving a predetermined dissolved substance in a non-aqueous solvent, the predetermined dissolved substance being selected from the group consisting of boric acid, 1-naphthalenesulfonic acid, 2-naphthalenesulfonic acid, 1,3,6-naphthalenetrisulfonic acid, and polystyrenesulfonic acid, and a salt thereof; mixing the dissolved solvent with pure water to obtain an additive solution; adding the additive solution into the first polymer solution to obtain a second polymer solution; and applying the second polymer solution to the inner conductive polymer film.

22 Claims, 1 Drawing Sheet

SOLID ELECTROLYTIC CAPACITOR AND FORMING METHOD FOR THE SAME

BACKGROUND OF THE INVENTION

This invention relates to a solid electrolytic capacitor and a method of forming the same.

Recent development has been directed to a solid electrolytic capacitor that comprises a conductive polymer layer as a solid electrolytic. For example, a solid electrolytic capacitor with conductive polymer is disclosed in U.S. Pat. No. 7,268,997 B2, the contents of which are incorporated herein by reference. Specifically, the disclosed solid electrolytic capacitor comprises a complex conductive polymer film; the complex conductive polymer consists of an inner conductive polymer film formed on an anodized film and an outer conductive polymer film formed on the inner conductive polymer film.

Various methods has been proposed for forming a conductive polymer film, especially, based on 3,4-ethylenedioxythiophene (EDOT) monomer. For example, methods for forming a conductive polymer film based on EDOT monomers are disclosed in U.S. Pat. Nos. 4,910,645, 4,959,430, 4,987,042, 5,035,926, EP 0440957B1, U.S. Pat. No. 4,780,796 and JP_A 2002-60736, the contents of those documents being incorporated herein by reference.

However, conductive polymer films formed in accordance with the above-listed methods are insufficient in conductivity. There is a need for a conductive polymer film with high conductivity and, in particular, to a conductive polymer film that, when used in a solid electrolytic capacitor, does not heighten an ESR value of the capacitor even at a high temperature of, for example, 100° C. or more.

SUMMARY OF THE INVENTION

According to one aspect of the present invention, a solid electrolytic capacitor comprising: a valve metal formed with an anodized film; an inner conductive polymer film formed on the anodized film; and an outer conductive polymer film formed on the inner conductive polymer film. The outer conductive polymer film is obtained by: preparing a first polymer solution (PEDOT/PSSA); dissolving a predetermined dissolved substance in a non-aqueous solvent, the predetermined dissolved substance being selected from the group consisting of boric acid, 1-naphthalenesulfonic acid, 2-naphthalenesulfonic acid, 1,3,6-naphthalenetrisulfonic acid, and polystyrenesulfonic acid, and a salt thereof; mixing the dissolved solvent with pure water to obtain an additive solution; adding the additive solution into the first polymer solution to obtain a second polymer solution; and applying the second polymer solution to the inner conductive polymer film.

An appreciation of the objectives of the present invention and a more complete understanding of its structure may be had by studying the following description of the preferred embodiment and by referring to the accompanying drawings.

Figure 1:
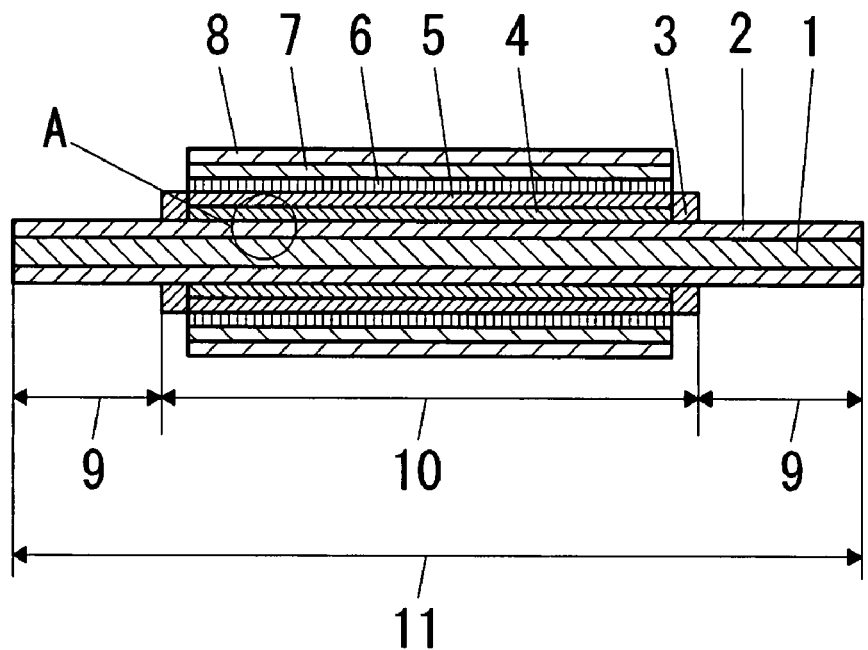
FIG. 1 is a cross-sectional view schematically showing an aluminum solid electrolytic capacitor in accordance with an embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DESCRIPTION OF PREFERRED EMBODIMENTS

Figure 2:
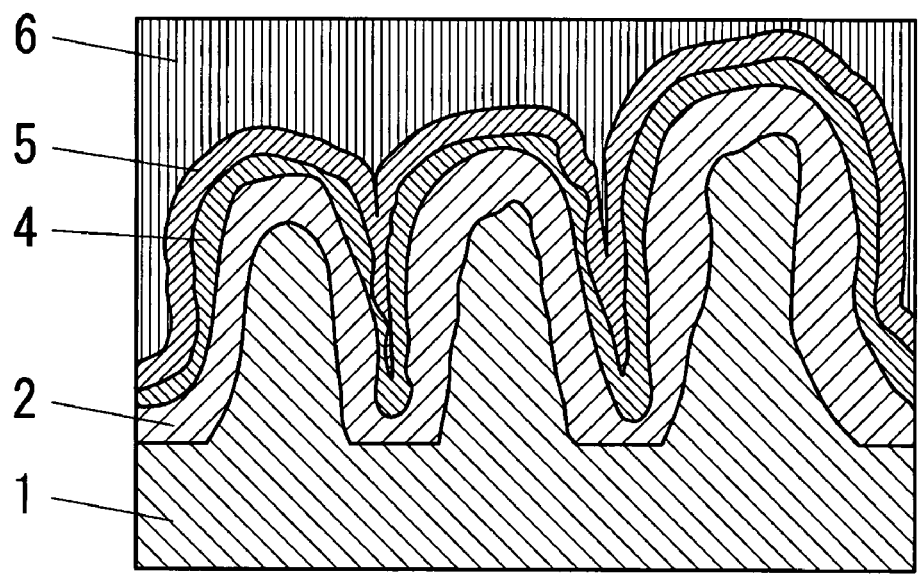
FIG. 2 is an enlarged cross-sectional view schematically showing a part of the aluminum solid electrolytic capacitor of FIG. 1, indicated with a circle "A."

With reference to FIGS. 1 and 2, a solid electrolytic capacitor according to an embodiment of the present invention is an aluminum solid electrolytic capacitor and comprises an etched aluminum film 1, anodized alumina films 2 formed on the both surfaces of the etched aluminum film 1, resist strips 3 formed on the anodized alumina films 2, precoat layers 4 formed between the resist strips 3 on the respective anodized alumina films 2, inner conductive polymer films 5 formed on the respective precoat layers 4, outer conductive polymer films 6 formed on the respective inner conductive polymer films 5, graphite layers 7 and silver-paste layers 8. The solid electrolytic capacitor may have another valve metal of tantalum or niobium.

The solid electrolytic capacitor can be formed by the following processes. First, an aluminum film is roughened by etching to obtain the etched aluminum film 1 that has roughened surfaces as shown in FIG. 2. In this embodiment, the etched aluminum film 1 has a rectangular shape as seen from the above. The aluminum film 1 is subjected to chemical conversion, for example, in an aqueous solution of adipic acid, citric acid, or phosphoric acid, or another aqueous solution including a salt of the listed acid, so that the anodized alumina films 2 are formed on the both surfaces of the aluminum film 1. Then, the resist strips 3 are formed to define a cathode section 10 and anode sections 9 so that the cathode section 10 is positioned between the anode sections 9. Thus, a base substrate 11 of an aluminum solid electrolytic capacitor is obtained. In this embodiment, the resist strips 3 are formed of thermoset resins, specifically, epoxy resins. However, the present invention is not limited thereto. The resist strips 3 may be formed of thermoplastic resins.

The cathode section 10 of the base substrate 11 is impregnated with a specific aqueous solution which comprises 0.5 to 3% by weight of polystyrenesulfonic acid (PSSA). The impregnated cathode section 10 is dried and hardened to form PSSA films as the precoat layers 4 on the anodized films 2, respectively. On the precoat layers 4 are formed the inner conductive polymer films 5, respectively, through a chemical oxidative polymerization method. For example, each of the inner conductive polymer films 5 is a chemical oxidation polymerization film of polypyrrole, polyethylenedioxythiophene or polyaniline, or a conductive polymer film formed from a polymer solution for forming the inner conductive polymer film as disclosed in Japanese Patent Application No. 2006-163574.

On each of the inner conductive polymer films 5 are formed the outer conductive polymer films 6, respectively. Each of the outer conductive polymer films 6 is obtained as follows.

The EDOT monomers are mixed with PSSA or its salt in an aqueous solution to obtain a mixture solution. Preferably, the PSSA or its salt has the average molecular weight of 10,000 to 500,000. The mixture solution is stirred, and oxidizers are added thereinto to obtain a first polymer solution (PEDOT/PSSA) through chemical oxidative polymerization.

Then, a predetermined dissolved substance is dissolved in a non-aqueous solvent. In this embodiment, the non-aqueous solvent is made of ethylene glycol (EG), polyethylene glycol (PEG) or glycerin (GC), and the predetermined dissolved substance is selected from the group consisting of 0.5 to 2% by weight of boric acid, 1 to 4% by weight of 1-naphthalenesulfonic acid (1-NSA), 1 to 4% by weight of 2-naphthalenesulfonic acid (2-NSA), 0.6 to 2.4% by weight of 1,3,6-naphthalenetrisulfonic acid (1,3,6-NTSA), and 0.1 to 1% by weight PSSA (preferably, its average molecular weight is 10,000 to 500,000), and a salt thereof.

The thus-obtained dissolved solvent is mixed with pure water to obtain an additive solution. In this embodiment, the additive solution comprises 5 to 95% by weight of the pure water. The additive solution is added into the first polymer solution to obtain a second polymer solution. In this embodiment, the second polymer solution comprises 5 to 50% by weight of the additive solution. The second polymer solution is applied to each of the inner conductive polymer films 5 and is dried so that the outer conductive polymer films 6 are formed on the inner conductive polymer films 5, respectively. After the formation of the outer conductive polymer films 6, the graphite layers 7 and the silver-paste layers 8 are formed in turn to obtain the solid electrolytic capacitor according to the present embodiment.

In the above-mentioned film formation processes, the non-aqueous solvent lowers surface tension of the first polymer solution to provide the first polymer solution with permeability. However, because non-aqueous solvent of N,N-dimethylformamide (DMF), N-methylpyrrolidone (NMP), dimethyl sulfoxide (DMSO), propylene carbonate (PC) and ethanol cause some problems in heat resistance or the like, these kinds of solvents are not preferable. The non-aqueous solvent of EG, PEG or GC according to the present embodiment is preferable as mentioned above. In addition, the above-mentioned predetermined dissolved substance prevents the conductivity of the outer conductive polymer film 6 from being lowered even if the non-aqueous solvent is mixed with the first polymer solution (PEDOT/PSSA). Therefore, the solid electrolytic capacitor of the present embodiment has a relatively-small ESR value even at a high temperature of, for example, 100° C. or more.

For evaluation of properties of solid electrolytic capacitors, a plurality of samples were formed, and first to third analyses were carried out for the formed samples.

The first analysis was directed to kinds of non-aqueous solvents of additive solutions and to the amounts of the additive solutions to the second polymer solutions. Each sample was formed in a manner as mentioned above, wherein an aqueous solution of adipic acid was used for forming the anodized alumina films 2, and the inner conductive polymer film 5 was a chemical oxidation polymerization film of polypyrrole. For each sample, Baytron-P® of H.C. Starck Ltd was used as the first polymer solution. Non-aqueous solvents of DMF, NMF, DMSO, PC, ethanol, EG, PEG and GC were prepared. Each solvent was 10 g. In each solvent, 0.2% by weight of 2-NSA and 0.12% by weight of 1,3,6-NTSA were dissolved. Then, pure water of 90 g was added into each of the dissolved solvents. They were stirred at room temperature, at 300 to 500 rpm and for 1 to 2 hour(s) to obtain the respective additive solutions. The additive solutions were into the first polymer solutions to obtain the second polymer solutions, respectively. The amounts of the additive solutions to the second polymer solutions were 0%, 5%, 10%, 25%, 50%, 60% by weight for each kind of the additive solutions. For each combination of the additive amounts and the kinds of the non-aqueous solvents, eight samples were formed.

The ESR values at 100 kHz of the thus obtained samples of the solid electrolytic capacitors were measured by an AC impedance bridge method under the conditions of 1 Vrms, 0V of DC bias. For each combination, the measurement results were averaged. The solvents of DMF, NMF, DMSO, PC and ethanol caused the conductivity of the polymer to be lowered, or they gelled when mixed with the first polymer solutions. The results of the solvents of EG, PEG and GC are shown in Tables 1 to 3, respectively.

TABLE 1

| | Amount of Additive Solution (wt %) | | | | | |
|---|---|---|---|---|---|---|
| | 0 | 5 | 10 | 25 | 50 | 60 |
| Initial ESR (mΩ; @100 kHz) | 2.97 | 2.77 | 2.69 | 2.64 | 2.63 | — |
| ESR After 200 h @125° C. (mΩ; @100 kHz) | 7.81 | 6.71 | 6.64 | 6.41 | 6.01 | — |

TABLE 2

| | Amount of Additive Solution (wt %) | | | | | |
|---|---|---|---|---|---|---|
| | 0 | 5 | 10 | 25 | 50 | 60 |
| Initial ESR (mΩ; @100 kHz) | 2.97 | 2.98 | 2.81 | 2.79 | 2.85 | — |
| ESR After 200 h @125° C. (mΩ; @100 kHz) | 7.81 | 6.78 | 6.69 | 6.70 | 6.42 | — |

TABLE 3

| | Amount of Additive Solution (wt %) | | | | | |
|---|---|---|---|---|---|---|
| | 0 | 5 | 10 | 25 | 50 | 60 |
| Initial ESR (mΩ; @100 kHz) | 2.97 | 2.66 | 2.58 | 2.49 | 2.45 | — |
| ESR After 200 h @125° C. (mΩ; @100 kHz) | 7.81 | 6.48 | 6.32 | 6.11 | 5.48 | — |

In Tables 1 to 3, " - - - " is shown in each column of 60 wt % of additive solution because the outer conductive polymer film was not formed under the condition of the 60 wt % additive amount. As apparent from Tables 1 to 3, larger amounts of additive solutions lead to lower ESR values both at the initial state and at the processed state (125° C, 200 hours). Among them, GC brings about the best results.

The second analysis was directed to the amounts of PSSA (its average molecular weight is 500,000) to additive solutions. Each sample for the second analysis was prepared in a manner similar to the first analysis. Each of the additive solutions was prepared by mixing pure water of 90 g, GC of 10 g and dissolved substances, followed by stirring them at room temperature, at 300 to 500 rpm and for 1 to 2 hour(s), wherein the dissolved substances for each solution comprises, 2-NSA of 1 g, boric acid of 1 g, citric acid of 2 g and PSSA of 0, 0.1, 0.2, 0.5, 1.0 or 1.5 wt %. Each of the above-mentioned additive solutions was added into the first polymer solution (Baytron-P® of H.C. Starck Ltd) to obtain the second polymer solution corresponding thereto. Each of the second polymer solution comprised 50% by weight of the above-mentioned additive solution. For each amount of PSSA, eight samples were formed.

The ESR values at 100 kHz of the thus obtained samples of the solid electrolytic capacitors were measured in a manner similar to the first analysis. For each amount of PSSA, the measurement results were averaged. The measurement results are shown in Table 4.

TABLE 4

| | Amount of PSSA to Additive Solution (wt %) | | | | | |
|---|---|---|---|---|---|---|
| | 0 | 0.1 | 0.2 | 0.5 | 1.0 | 1.5 |
| Initial ESR (mΩ; @100 kHz) | 3.01 | 3.11 | 3.23 | 2.99 | 3.79 | 7.04 |
| ESR After 200 h @125° C. (mΩ; @100 kHz) | 7.24 | 6.43 | 6.63 | 6.41 | 6.87 | 13.58 |

As apparent from Table 4, if the amount of PSSA is greater than 0 wt % and is not greater than 1.0 wt %, the ESR values at the processed state (125° C., 200 hours) are improved in comparison with the ESR value of 0 wt % PSSA.

The third analysis was directed to the amounts of non-aqueous solvents to additive solutions. Specifically, as the non-aqueous solvents, EG solvents were prepared. Each sample for the third analysis was prepared in a manner similar to the first analysis. Each of the additive solutions was prepared by mixing 2-NSA of 1 g, boric acid of 1 g, citric acid of 2 g and PSSA (its average molecular weight is 500,000) of 0.5 g, EG of 0 to 95 wt %, and pure water of the rest, followed by stirring them at room temperature, at 300 to 500 rpm and for 1 to 2 hour(s), so that a solution of 100 g was obtained as each additive solution. Each of the above-mentioned additive solutions was added into the first polymer solution (Baytron-P® of H.C. Starck Ltd) to obtain the second polymer solution corresponding thereto. Each of the second polymer solution comprised 50% by weight of the above-mentioned additive solution. For each amount of EG, eight samples were formed.

The ESR values at 100 kHz of the thus obtained samples of the solid electrolytic capacitors were measured in a manner similar to the first analysis. For each amount of EG, the measurement results were averaged. The measurement results are shown in Table 5.

TABLE 5

| | Amount of EG to Additive Solution (wt %) | | | | | |
|---|---|---|---|---|---|---|
| | 0 | 5 | 10 | 15 | 20 | 25 |
| Initial ESR (mΩ; @100 kHz) | 3.01 | 3.08 | 3.22 | 3.26 | — | — |
| ESR After 200 h @125° C. (mΩ; @100 kHz) | 7.62 | 6.47 | 6.67 | 6.68 | — | — |

In Table 5, " - - - " is shown in each column of 20 wt % and 25 wt % of EG to additive solution because the outer conductive polymer film was not formed under the condition in question. Dilution of the first polymer solution by the use of the additive solution contributes to cost reduction upon mass production. Therefore, a small amount of non-aqueous solvent to additive solution, specifically, greater than 0 wt % and not greater than 15 wt %, is preferable.

The present application is based on Japanese patent application of JP2006-319754 filed before the Japan Patent Office on Nov. 28, 2006, those contents being incorporated herein by reference.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A solid electrolytic capacitor comprising:
   a valve metal formed with an anodized film;
   an inner conductive polymer film formed on the anodized film; and
   an outer conductive polymer film formed on the inner conductive polymer film, wherein the outer conductive polymer film is obtained by:
   preparing a first polymer solution comprising polyethylenedioxythiophene and polystyrenesulfonic acid;
   dissolving a predetermined dissolved substance in a non-aqueous solvent, the predetermined dissolved substance being polystyrenesulfonic acid or its salt, the polystyrenesulfonic acid or its salt having an average molecular weight of 10,000 to 500,000;
   mixing the dissolved substance in the non-aqueous solvent with pure water to obtain an additive solution;
   adding the additive solution into the first polymer solution to obtain a second polymer solution; and
   applying the second polymer solution to the inner conductive polymer film.

2. The solid electrolytic capacitor according to claim 1, wherein the first polymer solution is prepared by:
   mixing monomers of formula (I) with a polymer of formula (II) or its salt in an aqueous solution to obtain a mixture solution; and

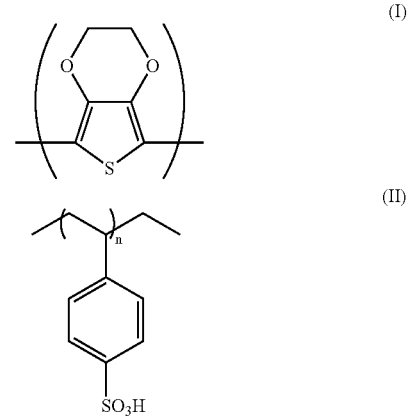

adding oxidizers into the mixture solution to obtain the first polymer solution through chemical oxidative polymerization.

3. The solid electrolytic capacitor according to claim 2, wherein the polymer of formula (II) or its salt has an average molecular weight of 10,000 to 500,000.

4. The solid electrolytic capacitor according to claim 1, wherein the second polymer solution comprises 5 to 50% by weight of the additive solution.

5. The solid electrolytic capacitor according to claim 1, wherein the non-aqueous solvent is made of ethylene glycol, polyethylene glycol or glycerin.

6. The solid electrolytic capacitor according to claim 1, wherein the inner conductive polymer film is a chemical oxidation polymerization film of polypyrrole, polyethylenedioxythiophene or polyaniline, or a conductive polymer film formed from a polymer solution for forming the inner conductive polymer film.

7. The solid electrolytic capacitor according to claim 1, wherein the valve metal is of tantalum, niobium or aluminum.

8. A solid electrolytic capacitor comprising:
a valve metal formed with an anodized film;
an inner conductive polymer film formed on the anodized film; and
an outer conductive polymer film formed on the inner conductive polymer film, wherein the outer conductive polymer film is obtained by:
preparing a first polymer solution comprising polyethylenedioxythiophene and polystyrenesulfonic acid;
dissolving a predetermined dissolved substance in a non-aqueous solvent, wherein the predetermined dissolved substance is selected from the group consisting of 0.5 to 2% by weight of boric acid, 1 to 4% by weight of 1-naphthalenesulfonic acid, 1 to 4% by weight of 2-naphthalenesulfonic acid, 0.6 to 2.4% by weight of 1,3,6-naphthalenetrisulfonic acid, and 0.1 to 1% by weight polystyrenesulfonic acid, and a salt thereof;
mixing the dissolved substance in the non-aqueous solvent with pure water to obtain an additive solution;
adding the additive solution into the first polymer solution to obtain a second polymer solution; and
applying the second polymer solution to the inner conductive polymer film.

9. The solid electrolytic capacitor according to claim 8, wherein the additive solution includes the predetermined dissolved substance of polystyrenesulfonic acid or its salt, the polystyrenesulfonic acid or its salt having an average molecular weight of 10,000 to 500,000.

10. A solid electrolytic capacitor comprising:
a valve metal formed with an anodized film;
an inner conductive polymer film formed on the anodized film; and
an outer conductive polymer film formed on the inner conductive polymer film, wherein the outer conductive polymer film is obtained by:
preparing a first polymer solution comprising polyethylenedioxythiophene and polystyrenesulfonic acid;
dissolving a predetermined dissolved substance in a non-aqueous solvent, the predetermined dissolved substance being selected from the group consisting of boric acid, 1-naphthalenesulfonic acid, 2-naphthalenesulfonic acid, 1,3,6-naphthalenetrisulfonic acid, and polystyrenesulfonic acid, and a salt thereof;
mixing the dissolved substance in the non-aqueous solvent with pure water to obtain an additive solution;
adding the additive solution into the first polymer solution to obtain a second polymer solution; and
applying the second polymer solution to the inner conductive polymer film;
wherein the additive solution comprises 5 to 95% by weight of the pure water.

11. The solid electrolytic capacitor according to claim 1, further comprising a precoat layer interposed between the anodized film and the inner conductive polymer film.

12. The solid electrolytic capacitor according to claim 11, wherein the precoat layer is a polystyrenesulfonic acid film formed by impregnating, at least in part, the anodized film with a specific aqueous solution, followed by drying the anodized film, the specific solution comprising 0.5 to 3% by weight of polystyrenesulfonic acid.

13. A method of forming a solid electrolytic capacitor, the method comprising:
forming a valve metal with an anodized film;
forming an inner conductive polymer film on the anodized film through a chemical oxidative polymerization method;
preparing a first polymer solution comprising polyethylenedioxythiophene and polystyrenesulfonic acid;
dissolving a predetermined dissolved substance in a non-aqueous solvent, the predetermined dissolved substance being selected from the group consisting of boric acid, 1-naphthalenesulfonic acid, 2-naphthalenesulfonic acid, 1,3,6-naphthalenetrisulfonic acid, and polystyrenesulfonic acid, and a salt thereof;
mixing the dissolved substance in the non-aqueous solvent with pure water to obtain an additive solution;
adding the additive solution into the first polymer solution to obtain a second polymer solution; and
applying the second polymer solution to the inner conductive polymer film to form an outer conductive polymer film on the inner conductive polymer film.

14. The method according to claim 13, wherein the preparing the first polymer solution comprises:
mixing monomers of formula (I) with a polymer of formula (II) or its salt in an aqueous solution to obtain a mixture solution; and

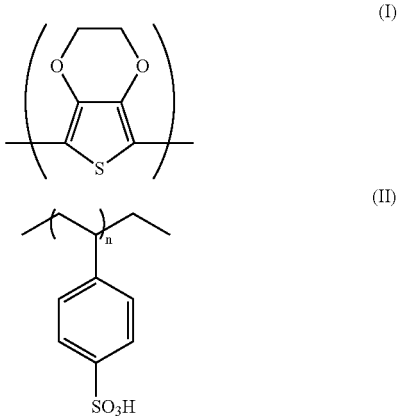

adding oxidizers into the mixture solution to obtain the first polymer solution through chemical oxidative polymerization.

15. The method according to claim 14, wherein the polymer of formula (II) or its salt has an average molecular weight of 10,000 to 500,000.

16. The method according to claim 13, wherein the second polymer solution comprises 5 to 50% by weight of the additive solution.

17. The method according to claim 13, wherein the additive solution includes the predetermined dissolved substance of polystyrenesulfonic acid or its salt, the polystyrenesulfonic acid or its salt having an average molecular weight of 10,000 to 500,000.

18. The method according to claim 13, wherein the predetermined dissolved substance is selected from the group consisting of 0.5 to 2% by weight of boric acid, 1 to 4% by weight of 1-naphthalenesulfonic acid, 1 to 4% by weight of 2-naphthalenesulfonic acid, 0.6 to 2.4% by weight of 1,3,6-naphthalenetrisulfonic acid, and 0.1 to 1% by weight polystyrenesulfonic acid, and a salt thereof.

19. The method according to claim 13, wherein the non-aqueous solvent is made of ethylene glycol, polyethylene glycol or glycerin.

20. The method according to claim 13, wherein the additive solution comprises 5 to 95% by weight of the pure water.

21. The method according to claim 13, further comprising forming a precoat layer on the anodized film so that the inner conductive polymer is formed on the precoat layer.

22. The method according to claim 21, wherein the forming the precoat layer comprises:

impregnating, at least in part, the anodized film with a specific aqueous solution, the specific aqueous solution comprising 0.5 to 3% by weight of polystyrenesulfonic acid; and then drying the anodized film.

* * * * *